United States Patent [19]
Svenning

[11] Patent Number: 5,096,381
[45] Date of Patent: Mar. 17, 1992

[54] REGULATING DEVICE FOR MAINTAINING CONSTANT THE ROTARY SPEED IN TURBINES

[75] Inventor: Sven Svenning, Tostared, Sweden

[73] Assignee: Sven Svenning Konsult AB, Bjorketorp, Sweden

[21] Appl. No.: 466,428

[22] PCT Filed: Sep. 8, 1988

[86] PCT No.: PCT/SE88/00457
§ 371 Date: Mar. 8, 1990
§ 102(e) Date: Mar. 8, 1990

[87] PCT Pub. No.: WO89/02531
PCT Pub. Date: Mar. 23, 1989

[30] Foreign Application Priority Data
Sep. 15, 1987 [SE] Sweden .............. 8703565-5

[51] Int. Cl.⁵ .............................................. F03D 7/06
[52] U.S. Cl. ..................................... 416/135; 416/138; 416/140; 416/163; 416/168 R
[58] Field of Search ........... 416/107, 118, 131, 132 R, 416/135, 138, 140, 147, 148, 149, 163, 137, DIG. 7, 132 B, 168 R

[56] References Cited

U.S. PATENT DOCUMENTS

| | | | |
|---|---|---|---|
| 213,960 | 4/1879 | Warwick et al. | 416/138 |
| 463,025 | 11/1891 | Bergman | 416/163 |
| 488,087 | 12/1892 | Opperud et al. | 416/163 |
| 498,068 | 5/1893 | Lonning | 416/140 R |
| 619,954 | 2/1899 | Goodrich | 416/163 |
| 723,293 | 3/1903 | Middlesworth | 416/118 |
| 1,133,595 | 3/1915 | Wenger | 416/131 R |
| 1,140,221 | 5/1915 | Welner | 416/118 |
| 1,558,645 | 10/1925 | Terhorst | 416/138 |
| 4,324,528 | 4/1982 | Svenning | 416/132 B |

FOREIGN PATENT DOCUMENTS 91760 9/1961 Denmark ................ 416/118

Primary Examiner—Edward K. Look
Assistant Examiner—James A. Larson
Attorney, Agent, or Firm—Dvorak and Traub

[57] ABSTRACT

The invention relates to a regulating device for maintaining constant the rotary speed in turbines of the type comprising a turbine hub and a number of turbine blades which are axially, but rotatably connected to the hub and have such a shape and are so aranged that each turbine blade in a flowing medium and by the action thereof is acted on by a torque about its longitudinal axis against the action of a spring device and acts on the turbine hub by a torque acting about the axis of rotation of the turbine. The features of the invention reside in that the regulating device further comprises a power-transmitter which is operable by an actuator for coordinating the angular motion and angular displacement of the turbine blades about the axes of rotation of the blades is connected to the turbine blades via linkage systems, the arrangement being such that each turbine blade when rotating about its axis of rotation acts on and brings about a corresponding rotation of the other turbine blade or the other turbine blades, and also being such that all turbine blades are rotatable about their geometrical axes of rotation by substantially equal angular displacements in relation to each other.

15 Claims, 3 Drawing Sheets

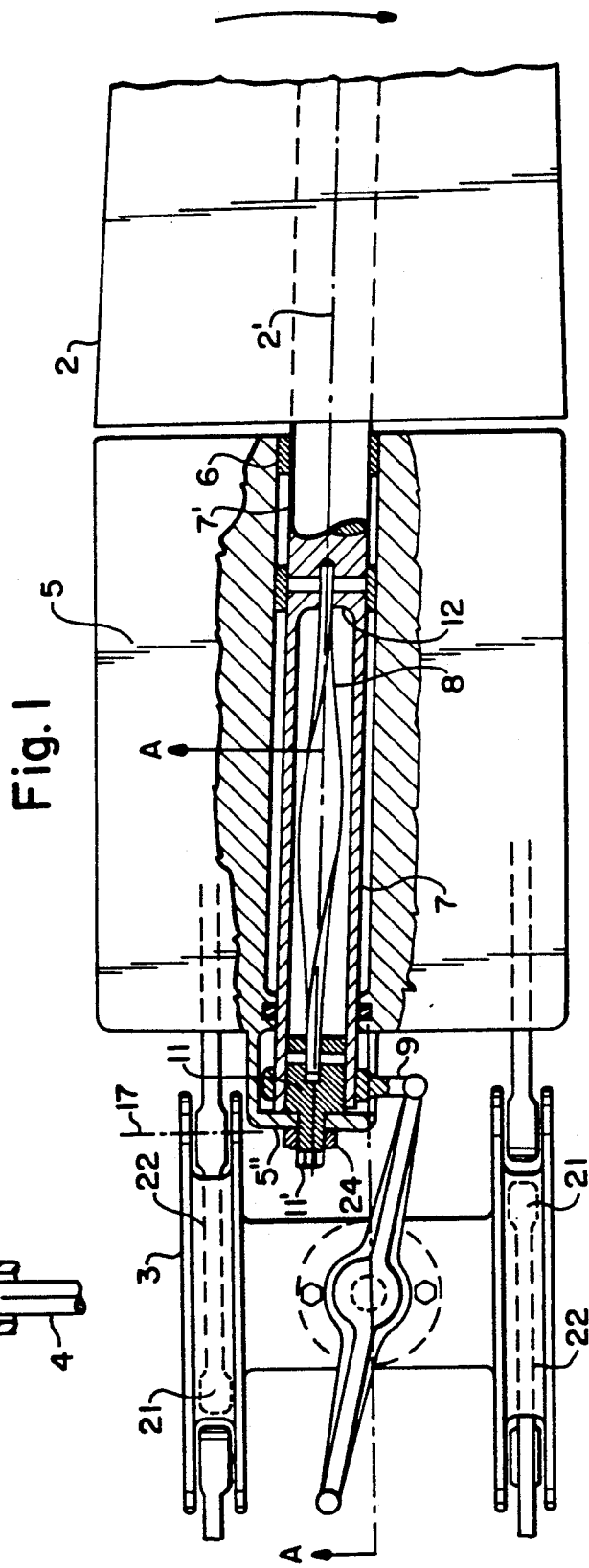
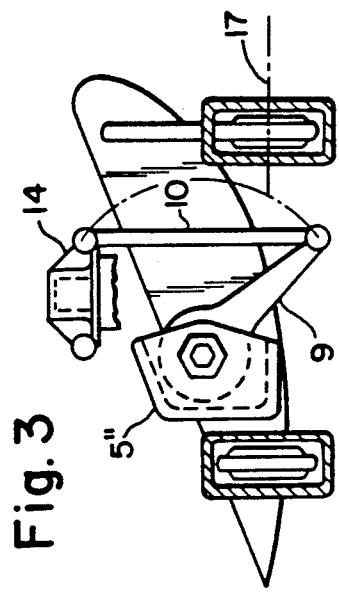
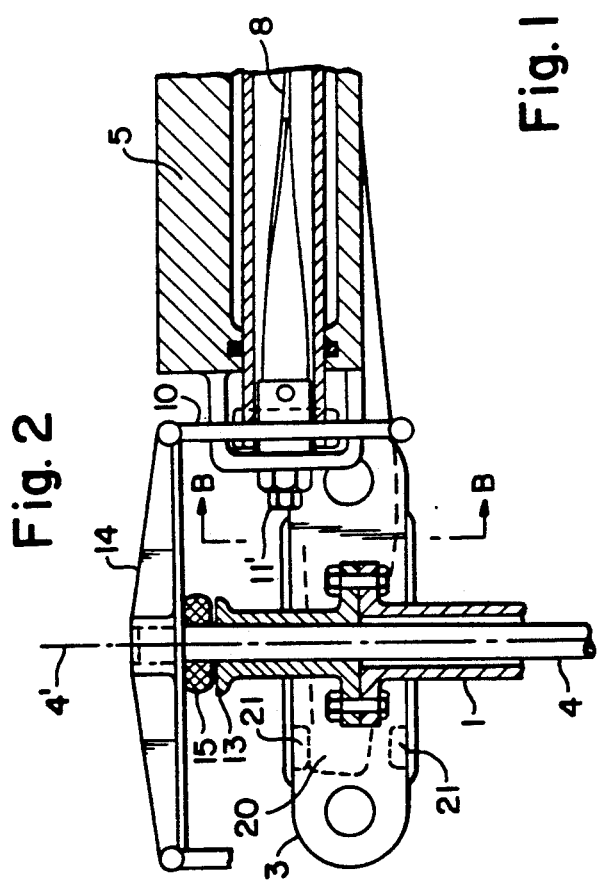

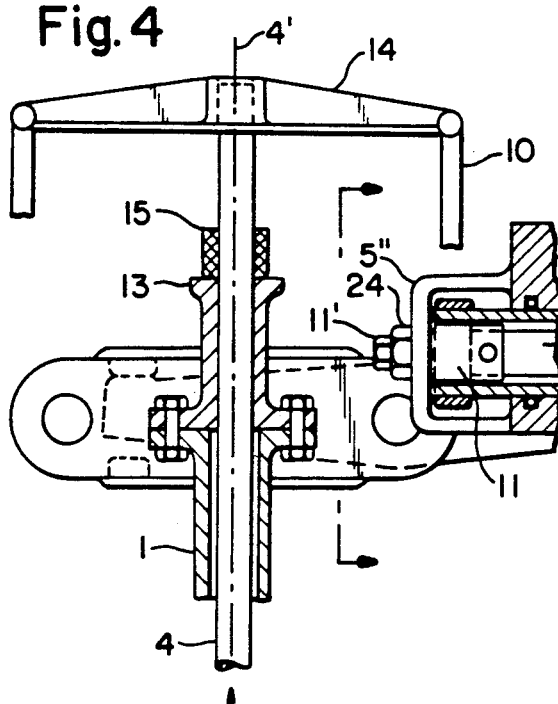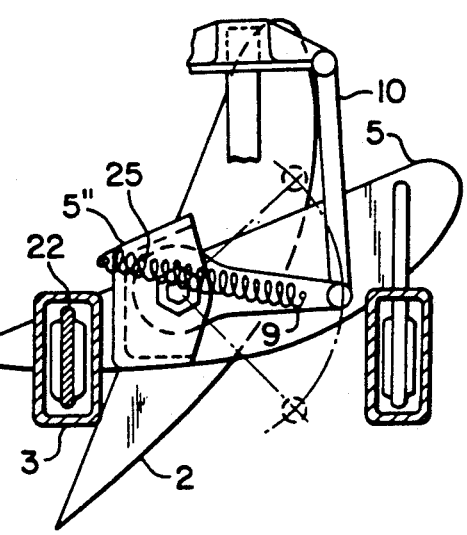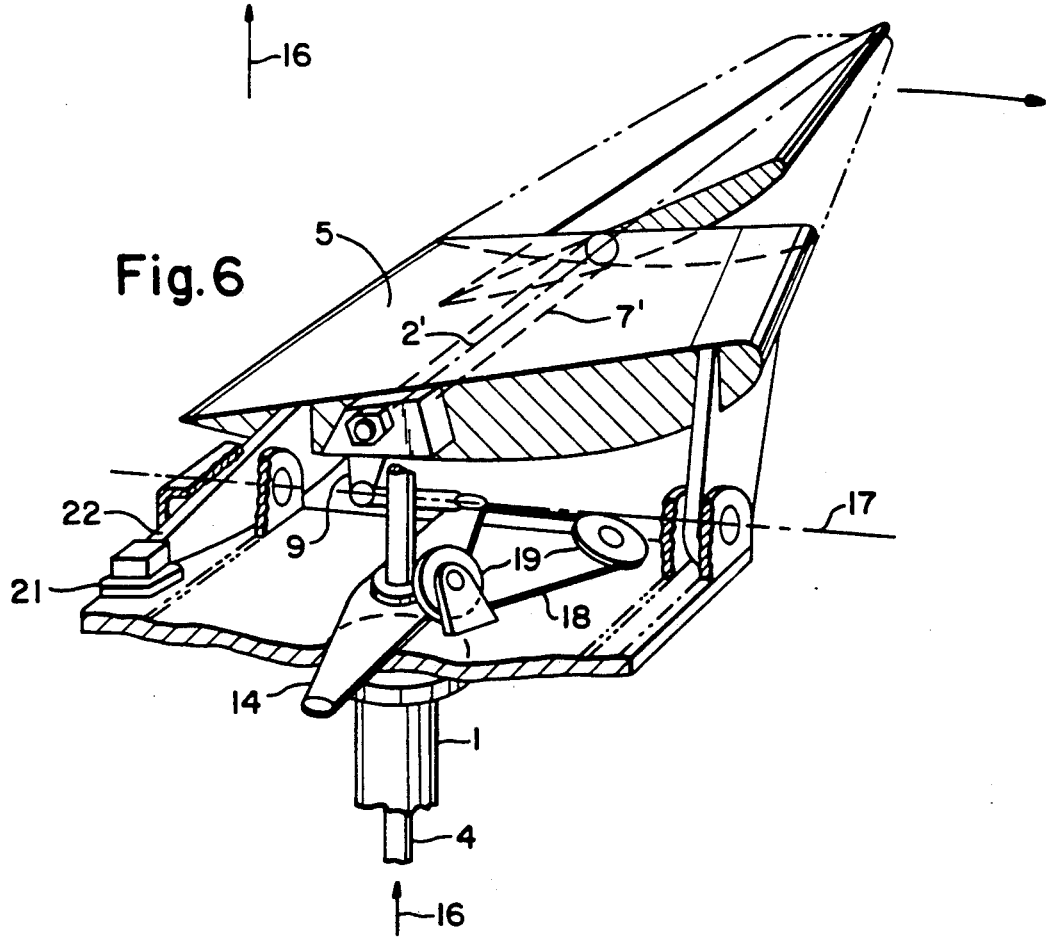

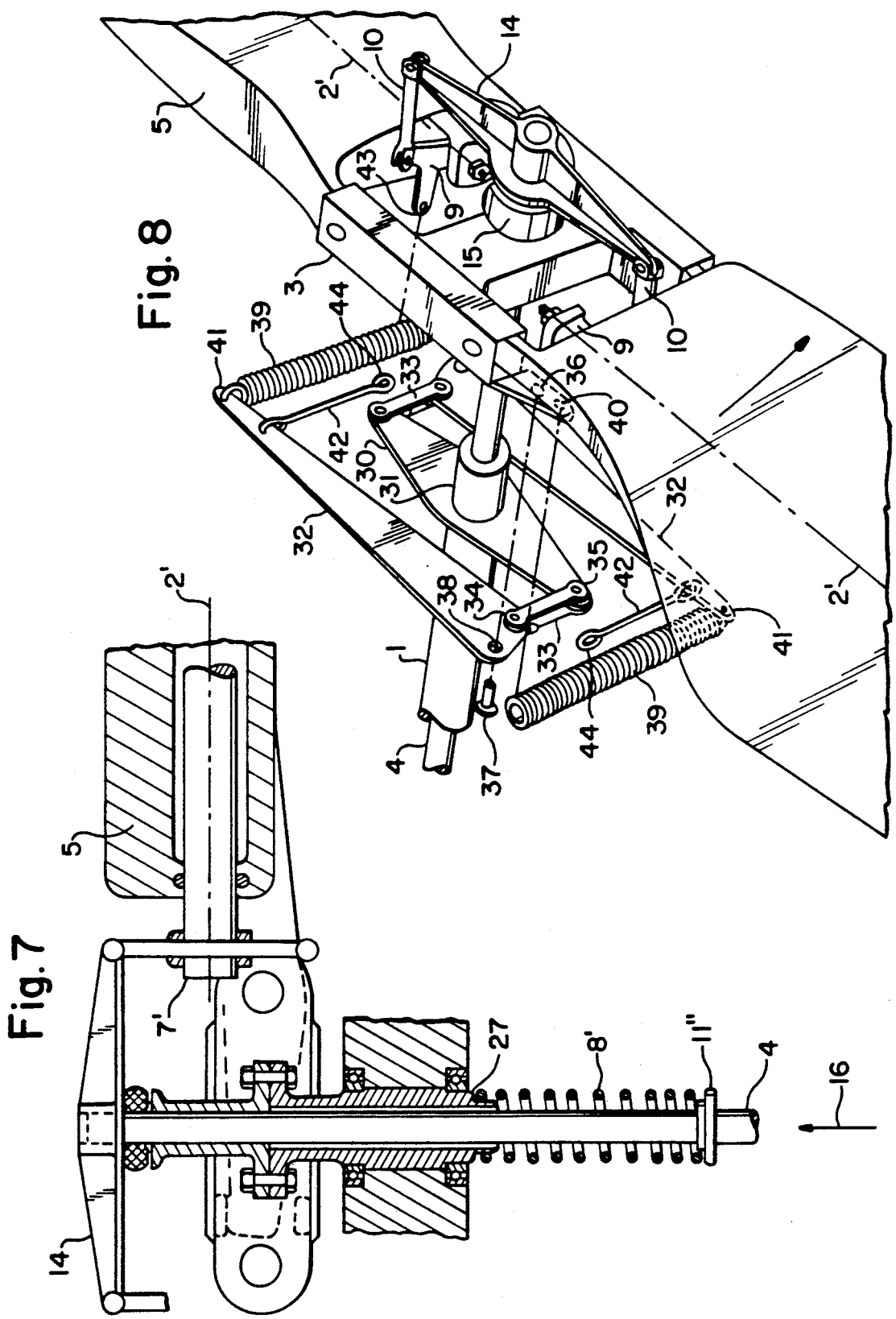

REGULATING DEVICE FOR MAINTAINING CONSTANT THE ROTARY SPEED IN TURBINES

The present invention relates to a regulating device for maintaining constant the rotary speed in turbines, especially wind-powered turbines.

Swedish Patent Specifications 387,161 and 426,091 disclose the possibility of maintaining constant the speed of rotation in wind-powered turbines from a selected lower wind-force limit up to a selected upper wind-force limit, above which the rotary speed is again reduced, by means of a regulating device automatically operating in dependence upon the wind force.

This prior art speed-regulating device is useful in wind-powered turbines having turbine blades extending substantially radially outwards from the turbine shaft and axially connected to the turbine hub by means of torsion springs, so as to be rotatable about their longitudinal axes in relation to the hub. The turbine blades are therefore rotatably mounted in bearing sleeves extending radially outwards from the hub and connected thereto. The arrangement is such that the wind forces acting on the blade exert, because of the curvature of the blade profile mean chord, a torque, pitch moment, on the blade about the longitudinal axis thereof against the action of the torsion spring. The torsion spring is arranged with a bias between two abutments radially spaced apart in relation to the hub. One of the abutments may be located in the non-adjustable part, the bearing sleeve, and the other at a part connected to the blade. Because of its bias, the torsion spring will exert an elastic torque between the blade and the bearing sleeve, the torque exerted by the wind forces on the turbine blade being counter-balanced by the elastic torque from the biased torsion spring.

In practice, this arrangement has been found to operate excellently, but in some cases has entailed problems which the present invention aims at solving.

One of these problems is that the turbine blades, when the wind impinges obliquely thereon, tend to rotate unequally with respect to each other through excessive angles of displacement, which may give rise to wobbling with a consequential increased load on the turbine. Another problem is that it is not possible to feather the turbine blades by an intentional operation for stopping the turbine, for instance in critical situations. A third problem is that the bias of the respective torsion spring is difficult to readjust once the turbine has been started. A fourth problem is the difficulty of complying with the desire to be able to modify the torsion torque of the spring within certain angular ranges to achieve more distinct speed-regulating and shut-off functions.

Finally, the invention has for its object, without any appreciable cost increase, to permit reducing the bending moment on the blade shafts and to improve the geometry and the space for synchronizing devices between the blades at the hub centre.

These objects have now been achieved by designing the inventive regulating device in accordance with the features described in the preferred embodiments.

The invention will now be described in more detail hereinbelow with reference to the accompanying drawings, in which FIG. 1 is a schematic view of part of a turbine as seen in the direction of the turbine shaft, with certain portions removed to illustrate a regulating and synchronizing device according to the invention operating between the turbine blades via the turbine hub, FIG. 2 is a longitudinal section taken along the line A—A in FIG. 1, FIG. 3 is a cross-section taken along the line B—B in FIG. 2, FIGS. 4 and 5 correspond to FIGS. 2 and 3, but illustrate the regulating device in a partially outwardly angled position and the turbine blade feathered correspondingly, FIG. 6 is a perspective view of an alternative embodiment in which the synchronizing means generally is rotatable and actively actuable by a push rod and a wire, FIG. 7 illustrates a modified embodiment in which the torsional load acting on the turbine blades is provided by means of a spring which is common to the blades and which acts directly on the actuator means for the device for coordinating the angular displacement of the blades, and FIG. 8, finally, is a perspective view showing an embodiment of the turbine according to FIGS. 1-7 supplemented with a device sensing the drive shaft torque and limiting it by acting on the pitch movement via spring-loaded moment arms in cases where a very narrow speed range is required, for instance when connecting a generator directly to the mains.

The turbine shown only partially in FIG. 1 is used as a wind turbine for driving a load, such as an electric generator, by a drive shaft 1. The turbine blades, of which only the inner portion of one blade 2 is shown, are rotatably connected to the turbine hub 3 by means of a respective regulating device comprising a torsion spring 8 coaxially mounted in a tubular member 7 which at its radially outer end is connected to the respective turbine blade 2 and extends axially through a hollow blade root 5 serving as a housing for the tubular member 7 and rotatably mounted on the blade shaft 7' by means of one or more bearings 6. At its radially inner end, the blade root 5 may either be fixedly or, for example as in an embodiment described further on in this specification, pivotally connected to the hub 3.

The housing (blade root) 5 and the tubular member 7 are axially held together by means of the torsion spring 8 which is disposed in the housing 5 and which, in the illustrated embodiment, is in the form of a leaf spring. At its radially outer end, the spring 8 is fixedly connected to the blade shaft 7' by means of a spring attachment 12. The tube 7, which thus forms a part of the blade shaft, accommodates in its radially inner end portion a spring attachment 11 having a head 11' easily accessible from the hub side and allowing adjustment of the bias of the spring 8 by means of a tool and being lockable by means of a locking nut 24 or similar means against the end of a projection 5" from the radially inner end of the housing 5. As far as the regulating device has been described hitherto, it agrees with the regulating device disclosed in Swedish Patent Specifications 387,161 and 426,091 and, as in the known regulating device, the spring 8 forms a torque-transmitting means between the blade 2 and the hub 3, the bias of the spring 8 determining the basic setting of the rotary speed of the turbine shaft.

As described in Patent Specification 387,161, the turbine blade has such a blade profile that this initiates about its aerodynamic centre a nose-dipping moment, pitch moment, substantially independently of the lift acting on the blade when the wind impinges thereon.

The blade is so arranged in relation to the common longitudinal axis of the two parts 5 and 7 that the wind force acting on the blade against the action of the torsion spring 8 gives rise to a moment acting about the axis of rotation 2' of the blade (FIG. 1). This moment tends to turn the blade about said axis which coincides with the common longitudinal axis of the parts 5 and 7.

In the embodiment of FIG. 1 in the above-mentioned patent specifications, there is no rotational connection between the shafts 7' of the turbine blades. In the embodiment according to the present invention illustrated in FIGS. 1, 2, 4 and 6, the mutual angular position of the blades 2 about the geometrical axes of rotation 2' is however maintained equal synchronously by means of a crank arm and linkage system 9, 10, 14 comprising a crank arm 9 mounted on the radially inner end of each blade shaft 7', a link arm 10 and a common synchronizing means 14. The respective link arm 10 is articulated at one end to the corresponding crank arm 9 and articulated at its other end to the synchronizing means 14. The synchronizing means 14 is so arranged that it coordinates the rotation of the blades about their longitudinal axes or geometrical axes of rotation 2'. To this end, the synchronizing means in an advantageous embodiment is composed of arms 14 symmetrically projecting from a common centre and rigidly connected to each other at their radially inner ends, e.g. by being designed as an integral unit. In the area of this centre, the synchronizing arms 14 are movably supported in relation to a common geometrical axis 4' extending at right angles to the longitudinal axes of the arms 14. In the illustrated embodiments, the geometrical axis 4' is formed of the longitudinal axis of a rod 4 which extends coaxially through the hollow drive shaft 1 and on one outer end portion of which the synchronizing means 14 is carried. For synchronizing the rotation of two blades 2, the synchronizing means 14 may have the form of a two-armed yoke. Depending on the arrangement of the crank arm and link arm system, the synchronizing means can be rotatably and/or displaceably arranged in relation to, i.e. about and along, respectively, the geometrical axis 4'. In the embodiment according to FIGS. 1-5, the synchronizing means 14 is displaceable together with the rod 4 which, in this case, is displaceably and optionally rotatably mounted in the drive shaft 1. In the embodiment according to FIG. 6, the synchronizing means 14 is rotatably mounted on the drive shaft 1 and so, the rod 4 need only be displaceably mounted in the drive shaft 1.

In the basic setting position of the blades 2, the synchronizing means 14, or optionally the rod 4, bears on an abutment. In FIGS. 2 and 4, this abutment is in the form of an elastic shock-absorbing ring 15 connected to the rod 4 and/or the synchronizing means 14 and arranged to cooperate with an abutment 13 connected to the drive shaft 1. The engagement of the synchronizing means 14 against or its distance from said dampening ring 15 is dependent upon a spring bias and a force initiated by the aerodynamic moment acting on the turbine blades 2. Thus, in the invention it has become possible to reduce the number of abutments to a single, centrally located abutment which is easily accessible from the hub centre.

In the motion-transmitting system 9, 10, 14, it is possible to design, for instance the link arm 10 or any part which transmits rotary movements from one turbine blade to another, as an elastic or otherwise dampening means to allow a certain individual rotational movement of the turbine blades.

When the wind force increases from a certain threshold value, the turbine blade 2 is turned about geometrical axis of rotation 2' by the torque determined by the wind force, as well as the size and shape of the blade, where an important factor is the curvature of the blade mean chord.

The rotation of the blade about its geometrical axis of rotation 2' upon an increase of the wind force is effected against the action of the elastic torque from the biased spring 8. The moment characteristics of the turbine blade 2 and the spring 8 have been so selected that the rotary speed of the turbine is maintained substantially constant above said wind-force threshold value up to a considerably higher wind-force value, at and above which the rotary speed of the turbine again starts to decrease because the aerodynamic moment of the turbine blade 2 above said threshold value increases more rapidly than the torsion torque. This is described in the above-mentioned Patent Specification 387,161.

As appears from the above and as illustrated in FIGS. 1 and 2, the torsion spring 8 according to the invention can be biased or tensioned by means of an easily accessible screw 11, 11' which at the same time forms the radially inner spring attachment 11 and can be fixed in the locked position by means of the nut 24. In an alternative embodiment (not shown), it is conceivable to tension or untension the torsion spring 8, for instance by remote-controlled means, for achieving a start and stop function, i.e. when it is desired to start or stop the turbine. When the turbine has been started, it is possible, as mentioned above, to set the desired speed of rotation.

FIGS. 4 and 5 show a turbine blade 2 which has rotated out of the basic setting position (shown in FIG. 3) to a partially feathered position as shown in FIG. 5, either because the aerodynamic moment of the turbine blade 2, in the event of excessive wind force, has been able to rotate the blade 2 against the action of the torsion spring 8 or because an external force 16 has been able to do so, whereby the synchronizing yoke 14 has been displaced in the direction of the longitudinal axis of the push rod 4 away from the abutment 13. The arrangement is such that it is also possible, by means of an external force 16, to displace the rod 4 acting on the synchronizing yoke 14, the link arm 10 and the crank arm 9, so as to rotate the turbine blade 2 against the action of the torsion spring 8, such that the turbine can be easily stopped also actively, i.e. by intentional influence. In this case, the screw 11, 11', i.e. the spring attachment, need not be used as a means for starting and stopping the turbine.

Further, it is possible by means of an additional spring 25 disposed, for instance, between the housing 5 and the crank arm 9 and shown only in FIG. 5, to act on the torsion torque against or with the aerodynamic moment of the turbine blade in a progressive manner, i.e. in a non-linear direction, e.g. for ensuring a more distinct shut-off function, i.e. stopping the turbine in the event of highly excessive wind force.

In FIG. 6, there is shown an alternative embodiment in which the synchronizing yoke 14 substantially is rotatably mounted about the turbine drive shaft 1, but connected to the blade shaft 2' in a manner similar to that described above for the link arm 10 and the crank arm 9. In this case, the turbine can also be stopped actively by an external force 16 via the rod 4 which, in this case, is not fixedly connected to the synchronizing yoke 14 but to whose outer end a wire 18 is so connected that the force 16 can be transmitted to the crank arm 9 via pulleys 19. Naturally, it is possible, via other remote-controlled regulating means, to rotate the blade shaft, either directly or via the crank arm 9.

In the patent specifications earlier mentioned, the flapping movement has been made possible by a resilient portion of the blade root, and in Patent Specification 426,091, FIG. 6 shows an embodiment with so-called flapping articulations in which the limitation of motion is however brought about by means of a resilient abutment against the hub portion.

According to the present invention, the rotation of the blade 2 about its geometrical axis of rotation 2' is compatible with the flapping motion of the blade in relation to the hub 3 about a flapping axis 17 in that the blade 2 proper is rotatable with respect to the blade root 5 which is not rotatable together with the blade, but is pivotally connected to the hub 3 for executing a pivotal movement, flapping, within certain limits about the flapping axis 17. The possible pivotal or flapping movement is limited by flapping bearing support arms 22 extending into a hollow part of the hub 3 between motion-limiting abutments 21.

It appears from the above that synchronization, i.e. coordination, of the angular motion and angular displacement of the blades about their axes of rotation 2' is achieved by relatively simple means, i.e. linkage systems consisting of the crank arms 9 connected to the rotatable blade portions 2, and the link arms 10 articulated to the crank arms 9 and hingedly connected to a power-transmitting or power-distributing means 14 which is centrally disposed in relation to the linkage systems and which in the illustrated embodiment for two turbine blades has the form of a two-armed yoke. It further appears that these power- and motion-transmitting systems act, via the means 14, on an element 4 which, by being subjected to an external force in the direction of the arrow 16, see FIGS. 4 and 6, however itself forms a means for acting on the power-distributing means 14 for rotating the turbine blades via the linkage systems against the wind forces for feathering the blades to such an extent that it is easier to stop the turbine, or for adjustments in the event of a high wind force.

The external force in the direction of the arrow 16 can be provided by means of an actuator (not shown) which may be controlled, e.g. electronically, in dependence upon selected parameters (wind force, prevailing torque, time etc.), or manually by a mechanical device of any suitable type.

The spring arrangement shown in FIG. 7 for biasing the turbine blades where only one blade shaft 7' is shown in FIG. 7, consists of a helical spring 8' disposed on the actuator means (the rod) 4 and acting between a preferably axially adjustable abutment 11" on the actuator means 4 and an abutment 27 on the drive shaft 1. In this embodiment, there are no torsion springs 8 of the type shown in FIG. 2 or any arrangement as described above for pre-setting the torsion springs, but otherwise the embodiment in FIG. 7 corresponds to that in FIG. 2.

It appears from FIG. 7 that the powerful spring 8' acts, by the actuator means (the rod) 4, on the device for coordinating the angular motion and angular displacement of the turbine blades 2 about their axes of rotation 2', i.e. the spring acts on the actuator means 4 and, via this means 4, on the power-transmitting means 14 and, via the link arms 10, on the blade shafts 7'.

The spring arrangement acting on the blades, i.e. the torsion springs 8 in FIGS. 1-6 and the helical spring 8' in FIG. 7, may of course be modified in several other ways than described above and illustrated in the drawings without departing from the inventive concept.

The moment-sensing device shown in FIG. 8 comprises the drive shaft 1 with a driver yoke 30 fixed thereto, and the drive shaft front end 31 which is rotatably mounted in the hub 3. Two moment arms 32, one for each turbine blade 2, are connected to the driver yoke 30 by a respective link arm 33 in points 34 and 35 and to the hub 3 in points 36 by means of a respective pin 37 in a hole 38. Two biased springs 39 are connected at their ends to the hub 3 in lugs 40 thereon and to the outer end 41 of the associated moment arm 32. Two drivers 42 in the form of flexible lines or the like are connected at their ends to a respective moment arm 32 and to a respective crank arm 9. In the illustrated embodiment, the crank arms have a projecting fixing point 43 for one end 44 of the respective driver 42.

As appears from FIG. 8, the driving force from the hub 3 rotatably mounted on the drive shaft 1 is transmitted via the moment arm fixing points 36 to the respective moment arm 32 at the bearing 37, 38, the relatively short lever arm between the fixing points 35 and 36 gearing down the relatively great driving force to a smaller force at the point of mounting of the biased spring 39 in the associated moment arm 32 at the end 41.

As appears from FIG. 8, the spring 39 is extended when the force exerted at the end 41 of the moment arm 32 exceeds the bias of the spring, which occurs when the desired maximum driving moment is attained. As in the illustrated case, moment arm 32 then acts via the driver 42 at the fixing point 43 of the crank arm 9 on the blade shaft 7', such that the turbine blade 2 can rotate in a direction towards a reduced driving moment.

I claim:

1. A turbine regulating device for maintaining constant rotary speed comprising:
   a turbine hub,
   a plurality of turbine blades supported by and rotatably connected to said hub, said turbine blades arranged and constructed to apply a torque acting about a turbine shaft,
   a spring arrangement arranged and constructed to rotate said turbine blade about a longitudinal geometrical axis of rotation substantially at right angles to said turbine shaft,
   a spring arrangement biasing means arranged and constructed to oppose a torque applied to said turbine blade by flowing fluid, said blade having a blade profile arranged and constructed to generate a pitch movement, said pitch movement being determined by said blade profile and being substantially independent of blade lift,
   an actuator means,
   a power transmitting means operable by said actuator means and moveably supported with respect to said hub, said power transmitting means arranged and constructed to coordinate angular motion and displacement of said turbine blades about said axis of rotation of said blades,
   a linkage system connecting said power transmitting means with said turbine blades, said linkage system having a crank arm connected to each turbine blade, said linkage system and power transmitting means arranged and constructed to rotate all turbine blades around their geometrical axis through an angular displacement substantially equal to a rotated turbine blade, abutment means having a resilient abutment and a fixed abutment, said resilient abutment being carried by said power transmitting means and being moveably arranged with respect to said hub, said fixed abutment fixedly supported with respect to said turbine hub and being arranged and constructed to cooperate with said resilient abutment and to accept reaction forces from said spring arrangement via said power transmitting means, whereby a force acts on said actuator means and on said turbine blades via said power transmitting means and said linkage system.

2. A regulating device according to claim 1, wherein said actuator means is rod shaped, and said actuator means is arranged and constructed to be coaxially displaceable and rotatable with respect to said turbine hub, whereby said turbine blades are rotatable by the actuator means via said power transmitting means and said linkage system.

3. A regulating device according to claim 1, wherein said power transmitting means is a multi-arm power distributing yoke, said yoke having one arm for each one turbine blade and being supported at its center by said actuator means.

4. A regulating device according to claim 1, further comprising an adjustable lockable set screw spring attachment, whereby each turbine blade is connected to said hub by said spring attachment.

5. A regulating device according to claim 1, further comprising a geometric flapping axis around which said blades rotate with respect to said turbine hub.

6. A regulating device according to claim 1, wherein the geometric axis of rotation, said turbine shaft, and a geometric flapping axis perpendicular to said turbine shaft are disposed in different planes, whereby as the bending moment a the blade shaft is decreased, geometry is improved, and a larger area for power distribution is achieved.

7. A regulating device according to claim 1, further comprising resilient link arm connecting said crank arms with said power transmitting means.

8. A regulating device according to claim 1, further comprising a resilient means arranged and constructed to act between said crank arm, and a part connected to said hub, whereby a moment is progressively applied to said spring arrangement.

9. A regulating device according to claim 1, wherein said power transmitting means has a power distributing arm, and a link arm is disposed between said crank arm and said power distributing arm, a portion of said link arm being elastically deformable in a direction along said power distributing arm.

10. A regulating device according to claim 1, further comprising at least one flapping bearing support arm connecting a blade root to said hub, and two motion-limiting abutments connected to said hub, said support arm extending past a geometric flapping axis between said motion limiting abutments.

11. A regulating device according to claim 1, further comprising a moment sensing device, said hub being rotatably connected to said turbine shaft, whereby twisting of said turbine shaft acts upon said moment sensing device to twist said turbine blades.

12. A regulating device according to claim 11, wherein said moment sensing device comprises moment arms, a driver yoke fixed on said drive shaft, link arms connecting said moment arms to said yoke and said hub, and drivers connected to said moment arms and said crank arm.

13. A regulating device according to claim 12, further comprising biased springs connected to said hub and to said moment arm.

14. A regulating device according to claim 1, wherein said power transmitting means is a multi-arm power distributing yoke, said yoke being supported at its center by said actuator means.

15. A regulating device according to claim 1, further comprising an adjustable set screw spring attachment, whereby each turbine blade is connected to said hub by said spring attachment.

* * * * *